(12) United States Patent
DuPont

(10) Patent No.: US 8,118,141 B2
(45) Date of Patent: Feb. 21, 2012

(54) CLAMP JAW AND CLAMP

(75) Inventor: Anthony James DuPont, Boise, ID (US)

(73) Assignee: IO Dupont LLC, Boise, ID (US)

( * ) Notice: Subject to any disclaimer, the term of this patent is extended or adjusted under 35 U.S.C. 154(b) by 308 days.

(21) Appl. No.: 12/361,435

(22) Filed: Jan. 28, 2009

(65) Prior Publication Data

US 2010/0186537 A1 Jul. 29, 2010

(51) Int. Cl.
*B62L 3/00* (2006.01)

(52) U.S. Cl. .................................... 188/24.22

(58) Field of Classification Search .............. 74/500.5; 188/24.15, 24.21, 24.22, 79.57; 403/209; 269/257, 261, 268, 269

See application file for complete search history.

(56) References Cited

U.S. PATENT DOCUMENTS

| | | | |
|---|---|---|---|
| 1,758,948 A * | 5/1930 | Helm | 24/135 R |
| 1,846,445 A | 2/1932 | Matthews | |
| 1,857,437 A | 5/1932 | Cole | |
| 4,718,521 A | 1/1988 | Hosokawa | |
| 5,192,063 A * | 3/1993 | Peterson et al. | 269/257 |
| 5,224,571 A | 7/1993 | Lin | |
| 5,373,918 A | 12/1994 | Nagano | |
| 5,579,560 A | 12/1996 | Brueck | |
| 5,865,276 A | 2/1999 | Sugimoto | |
| 5,896,956 A | 4/1999 | Lin et al. | |
| 6,349,799 B1 | 2/2002 | Kariyama | |

* cited by examiner

*Primary Examiner* — Vicky Johnson
(74) *Attorney, Agent, or Firm* — Buchanan Nipper

(57) ABSTRACT

In one embodiment, a clamp jaw includes a face having an annular groove therein and a linear groove therein tangent to the annular groove. In another embodiment, an assembly includes an overhand loop in a cord compressed between two faces.

21 Claims, 11 Drawing Sheets

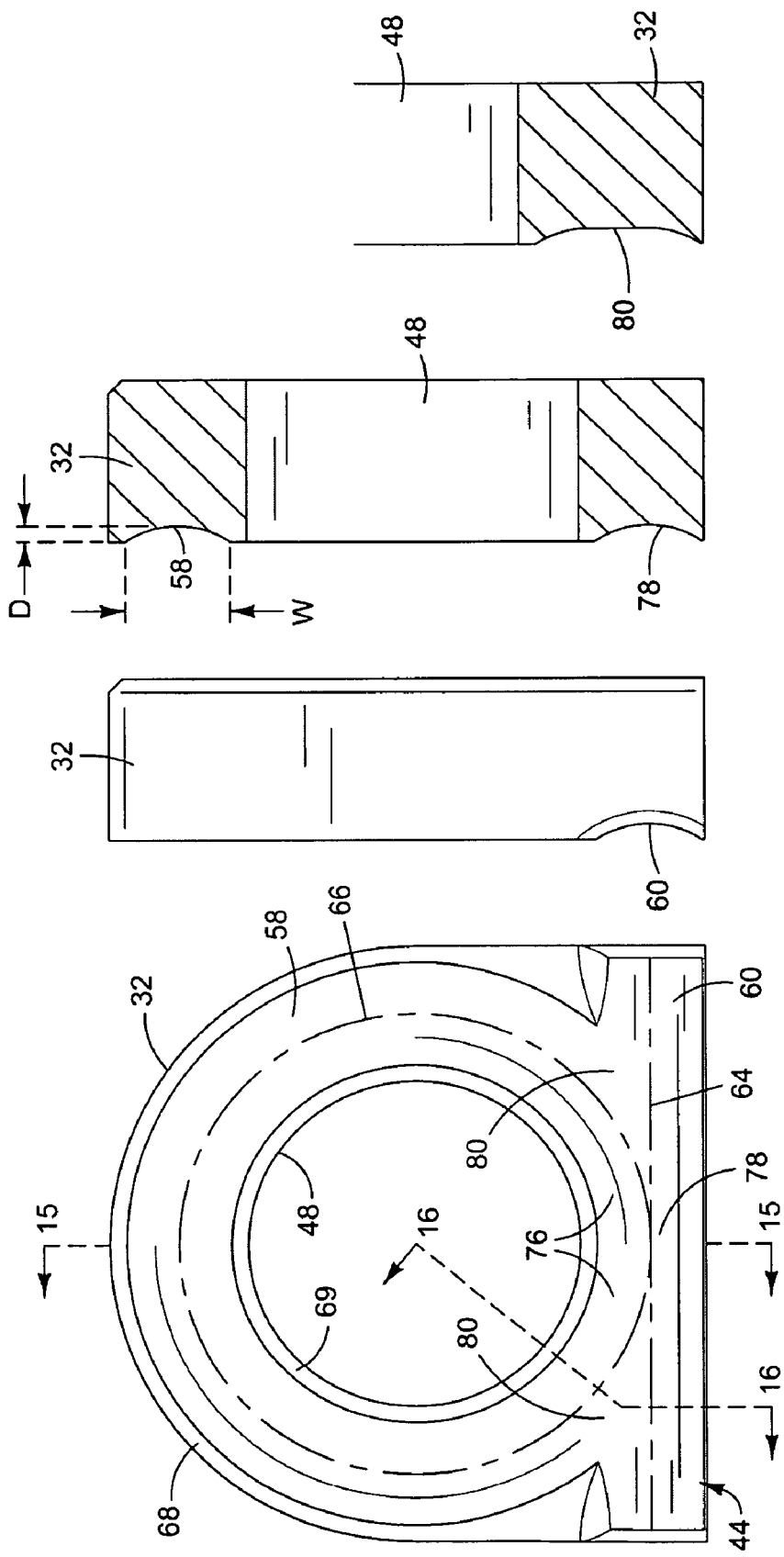

CLAMP JAW AND CLAMP

BACKGROUND

A cord may be used to transmit motion from one part to another part. For example, fixed length cords are often used to transmit the motion of a shift lever on a bicycle to a gear derailleur and from a brake lever to a brake caliper. Bicycle shift control cords are usually clamped at one end to the derailleur. Similarly, bicycle brake control cords are usually clamped at one end to the brake caliper.

DRAWINGS

Figure 2:
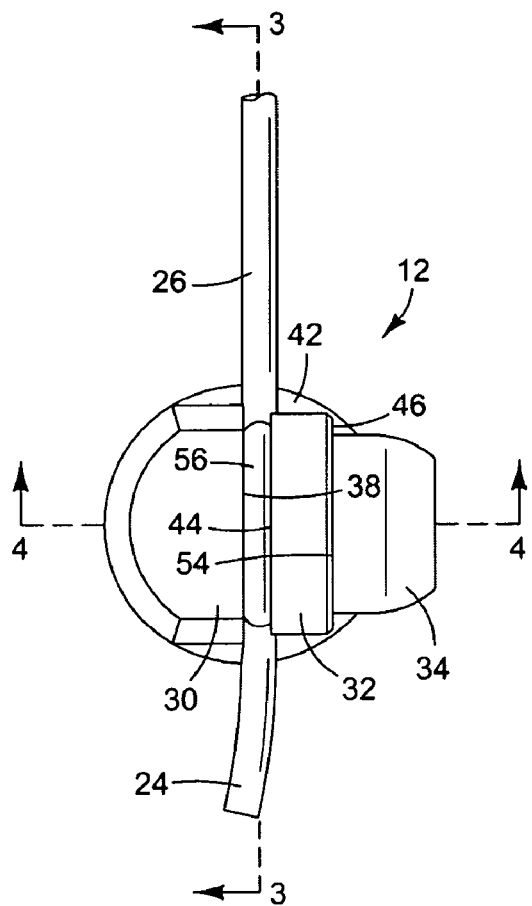
FIG. 2 is a close-up elevation view of the cord clamp used in the brake assembly shown in FIG. 1.
Figure 3:
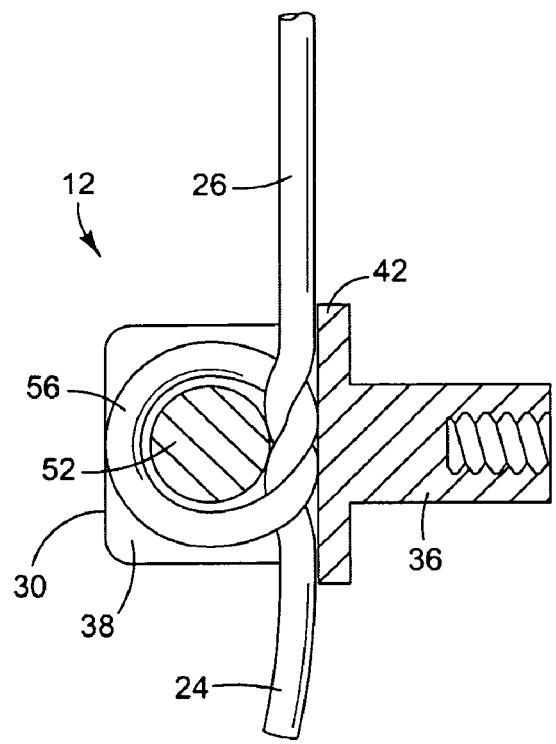
Figure 4:
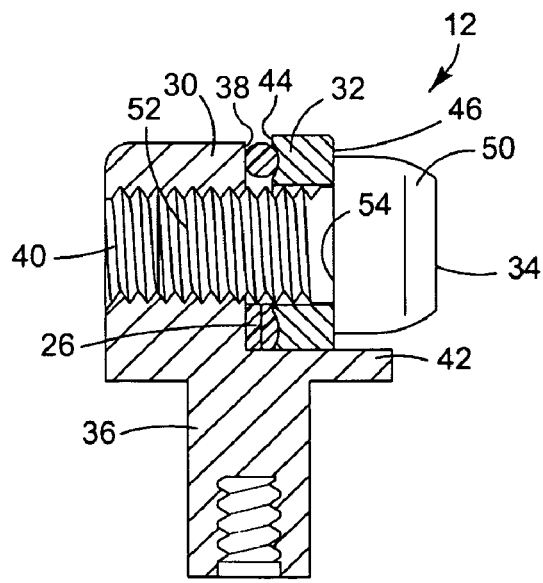

FIGS. 3 and 4 are section views taken along the lines 3-3 and 4-4, respectively, in FIG. 2.

Figure 5:
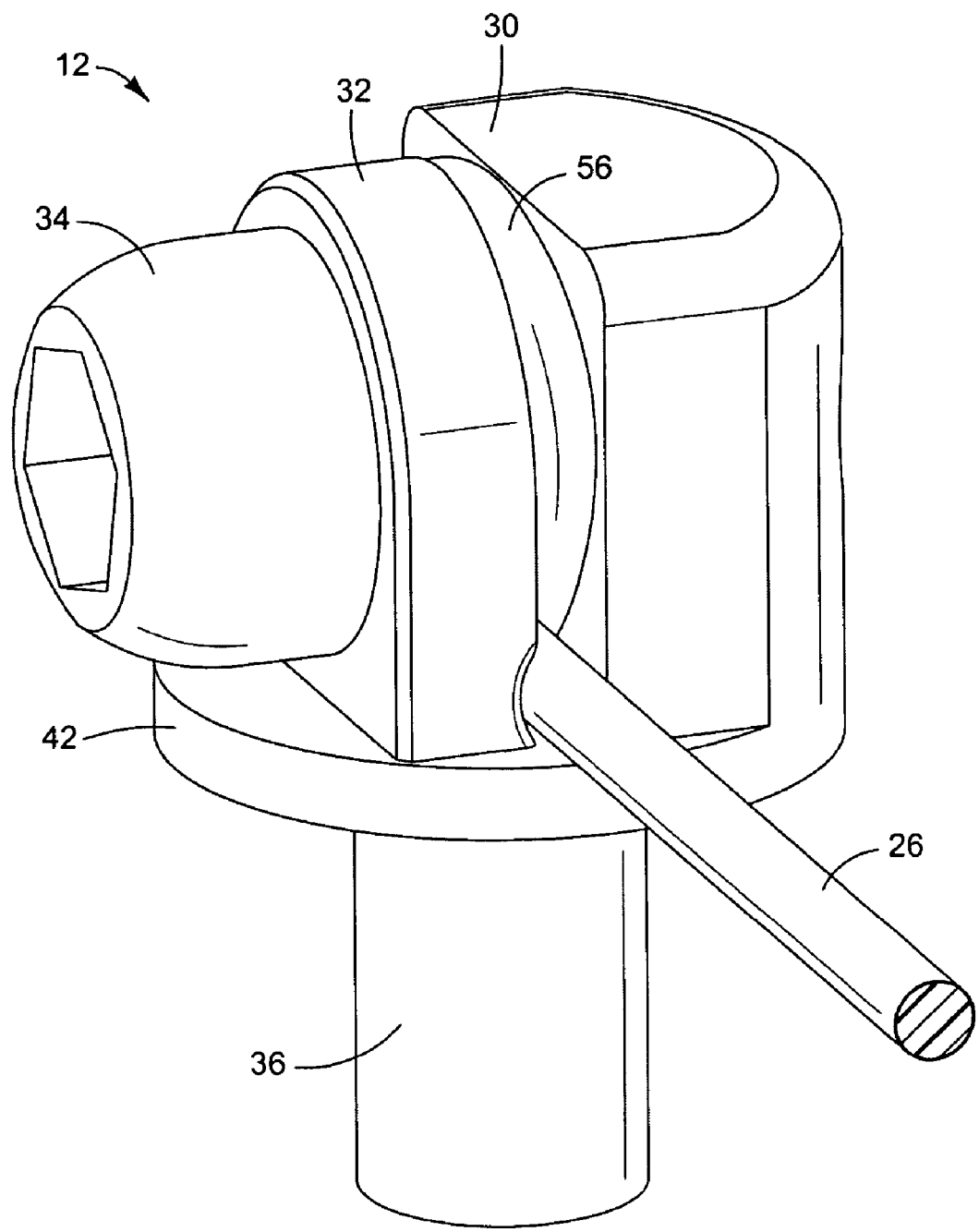

FIG. 5 is a close-up perspective view of the cord clamp shown in FIGS. 2-4.

Figure 6:
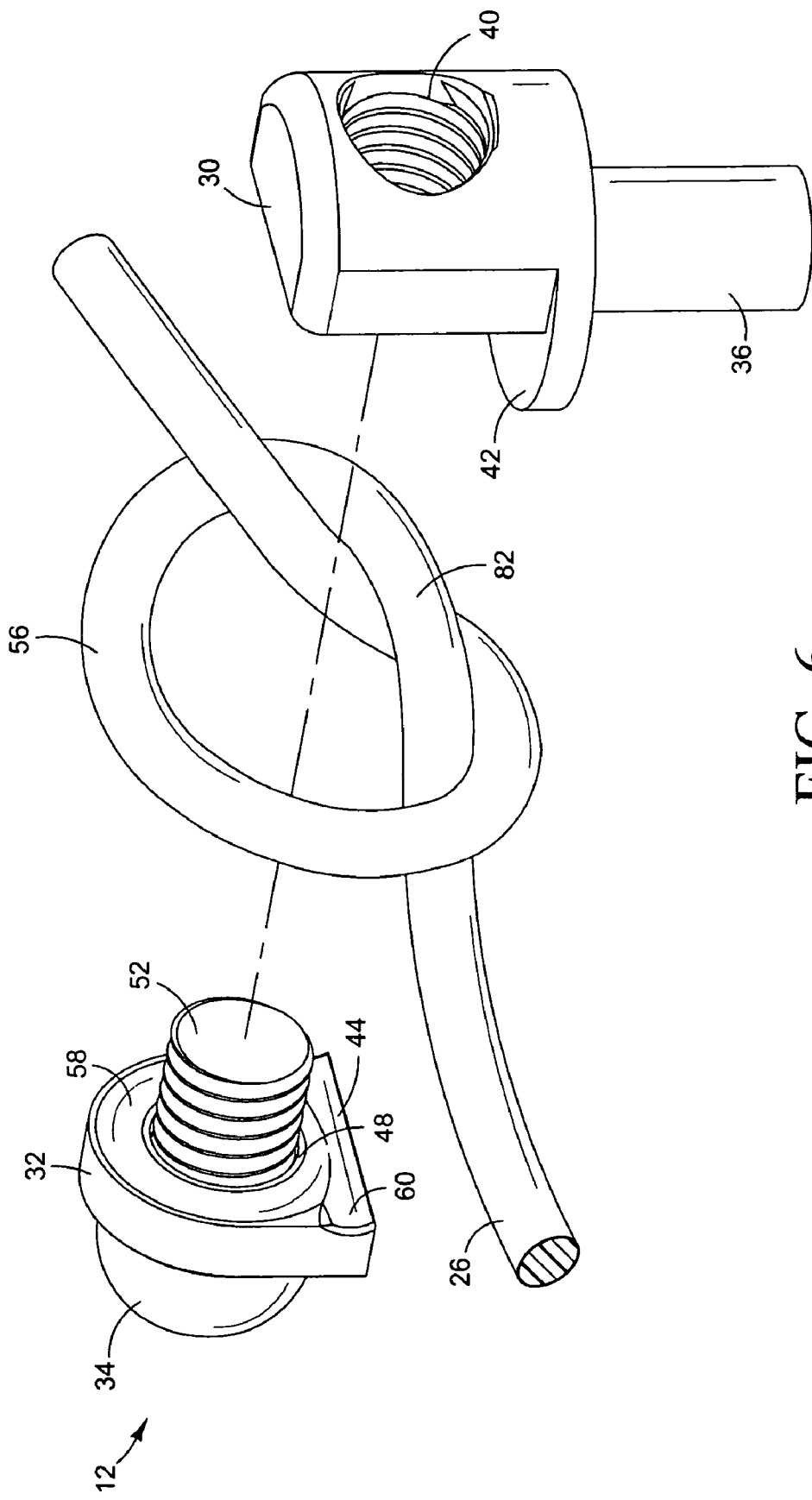

FIG. 6 is a partially exploded perspective view of the cord clamp of FIG. 5 showing the overhand loop in the cord before it has been tightened down to fit on to the grooved jaw face.

Figure 7:
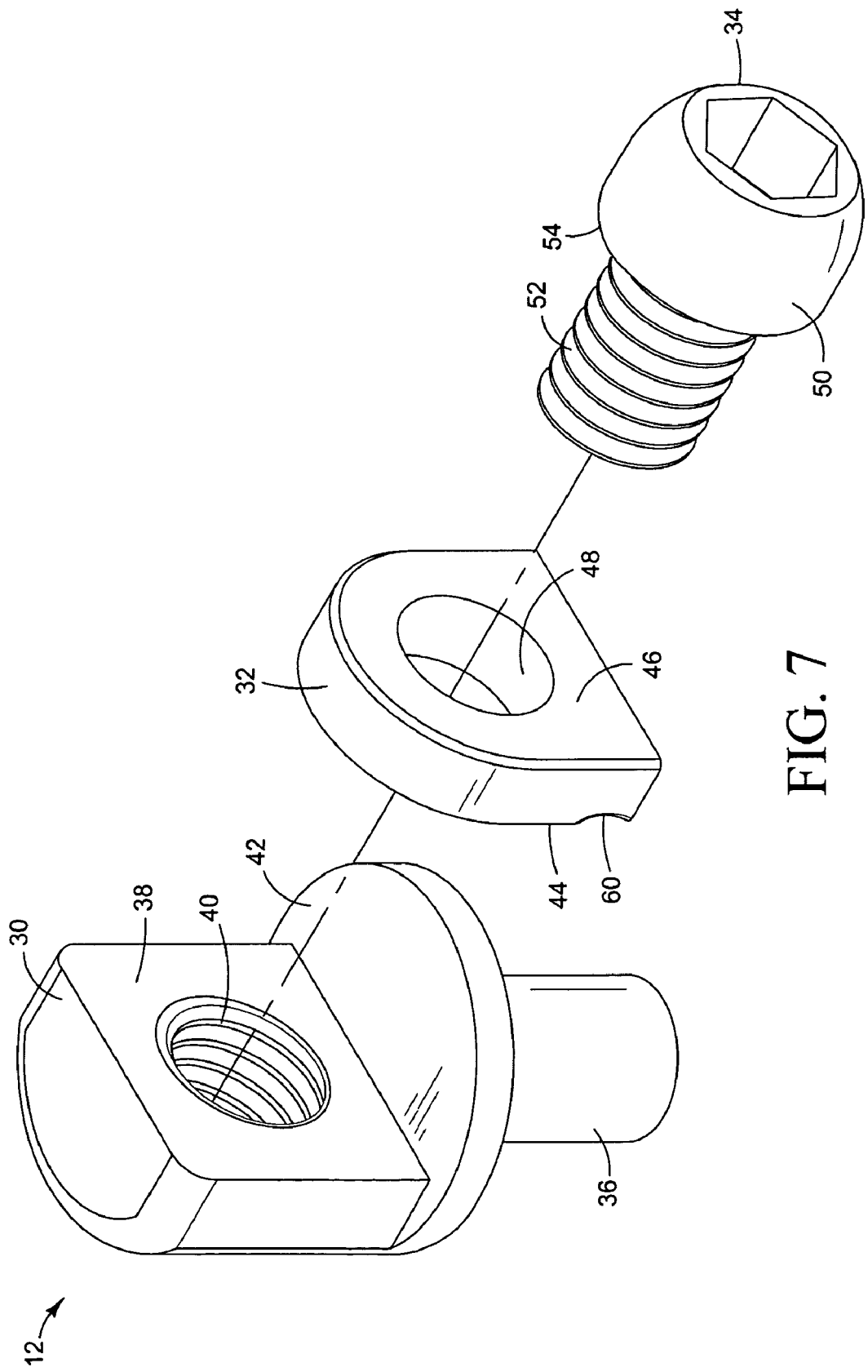

FIG. 7 is an exploded perspective view of the cord clamp of FIG. 5 without the cord.

Figure 8:
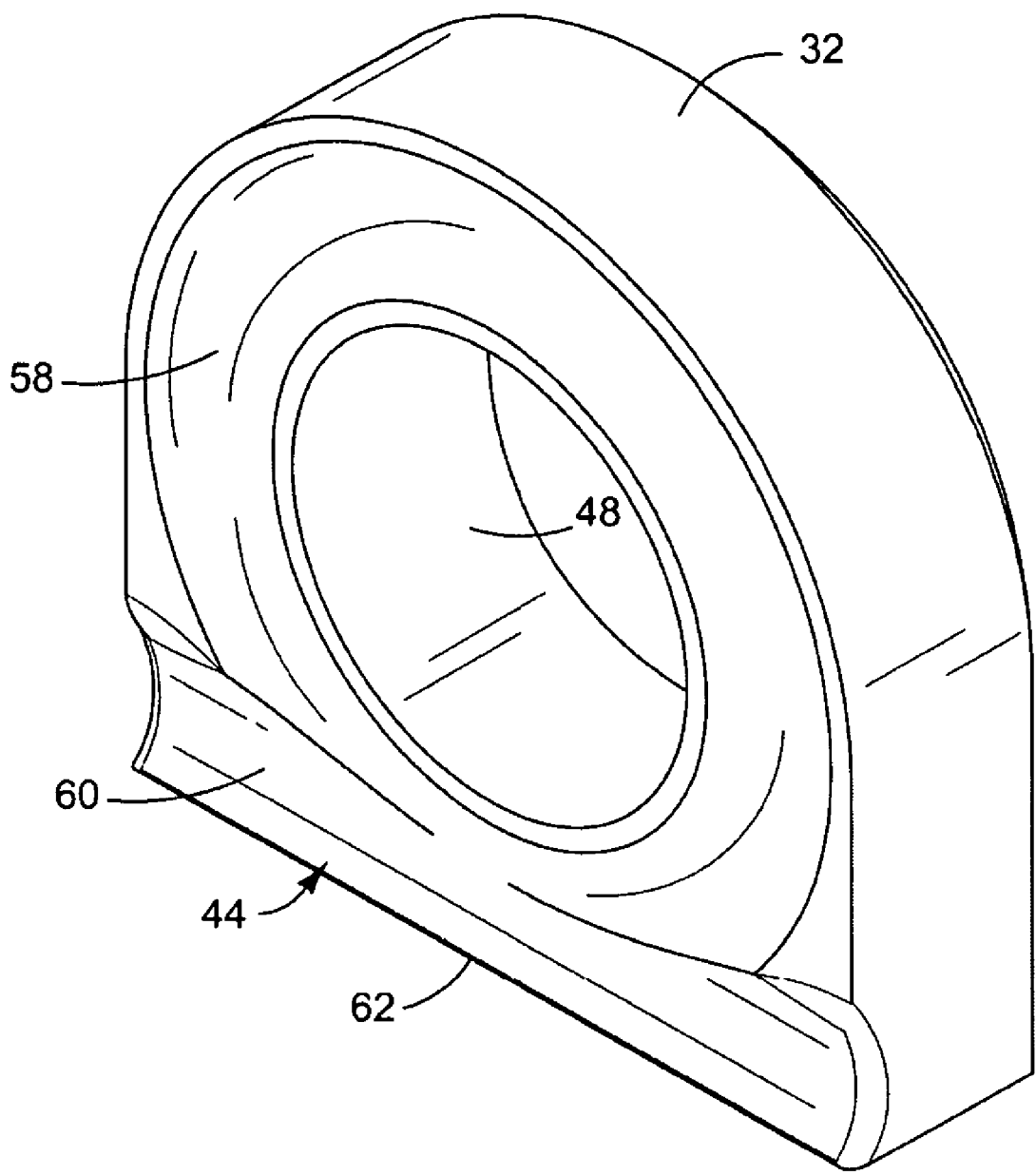

FIG. 8 is a perspective view of the grooved jaw in the cord clamp shown in FIGS. 2-7.

Figures 9, 10, 11, 12:
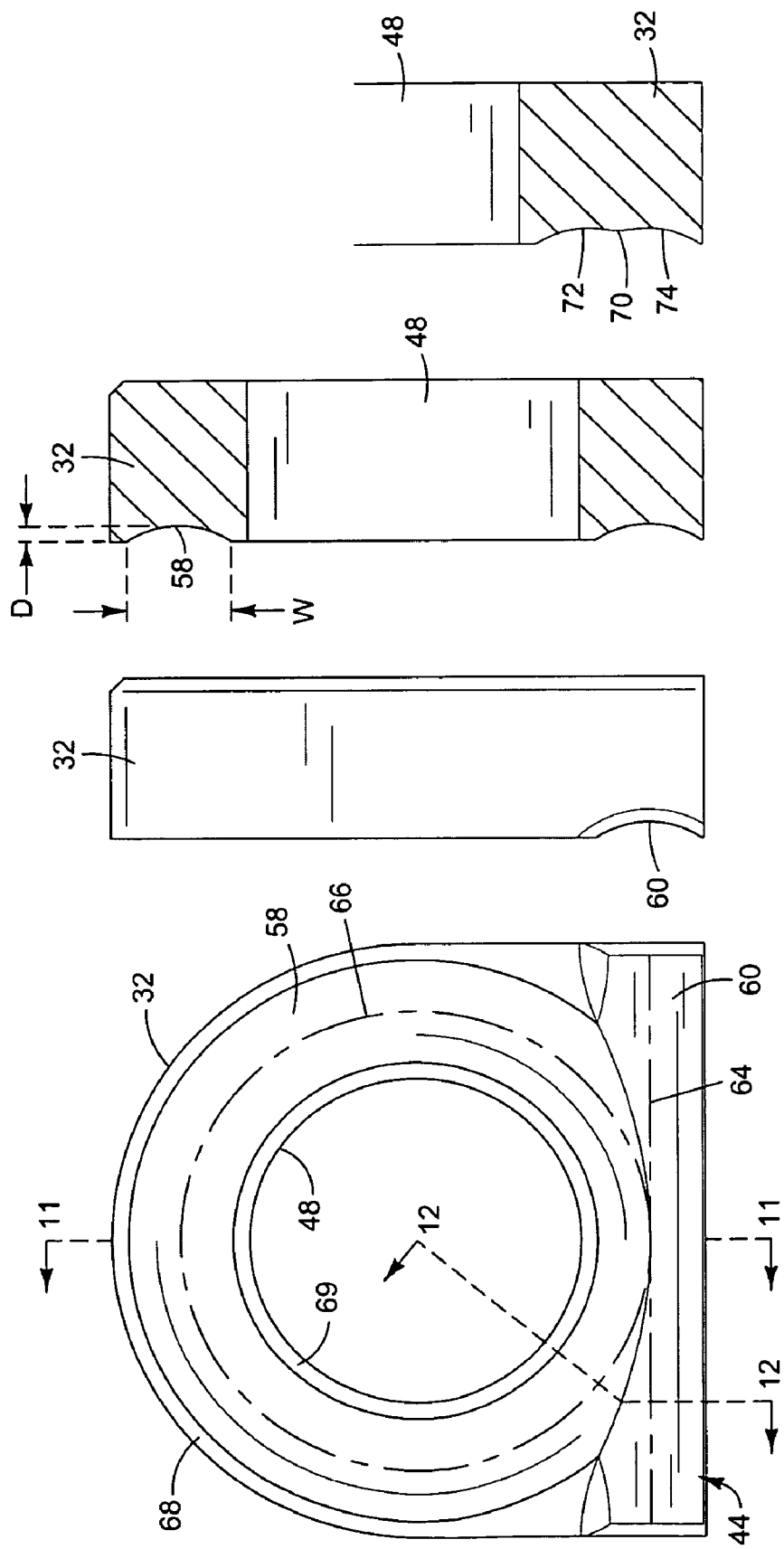

FIGS. 9 and 10 are front and side elevation views, respectively, of the grooved jaw shown in FIG. 8.

FIGS. 11 and 12 are section views taken along the lines 11-11 and 12-12, respectively, in FIG. 9.

FIGS. 13 and 14 are front and side elevation views, respectively, of a grooved jaw according to another embodiment.

FIGS. 15 and 16 are section views taken along the lines 15-15 and 16-16, respectively, in FIG. 13.

Figure 17:
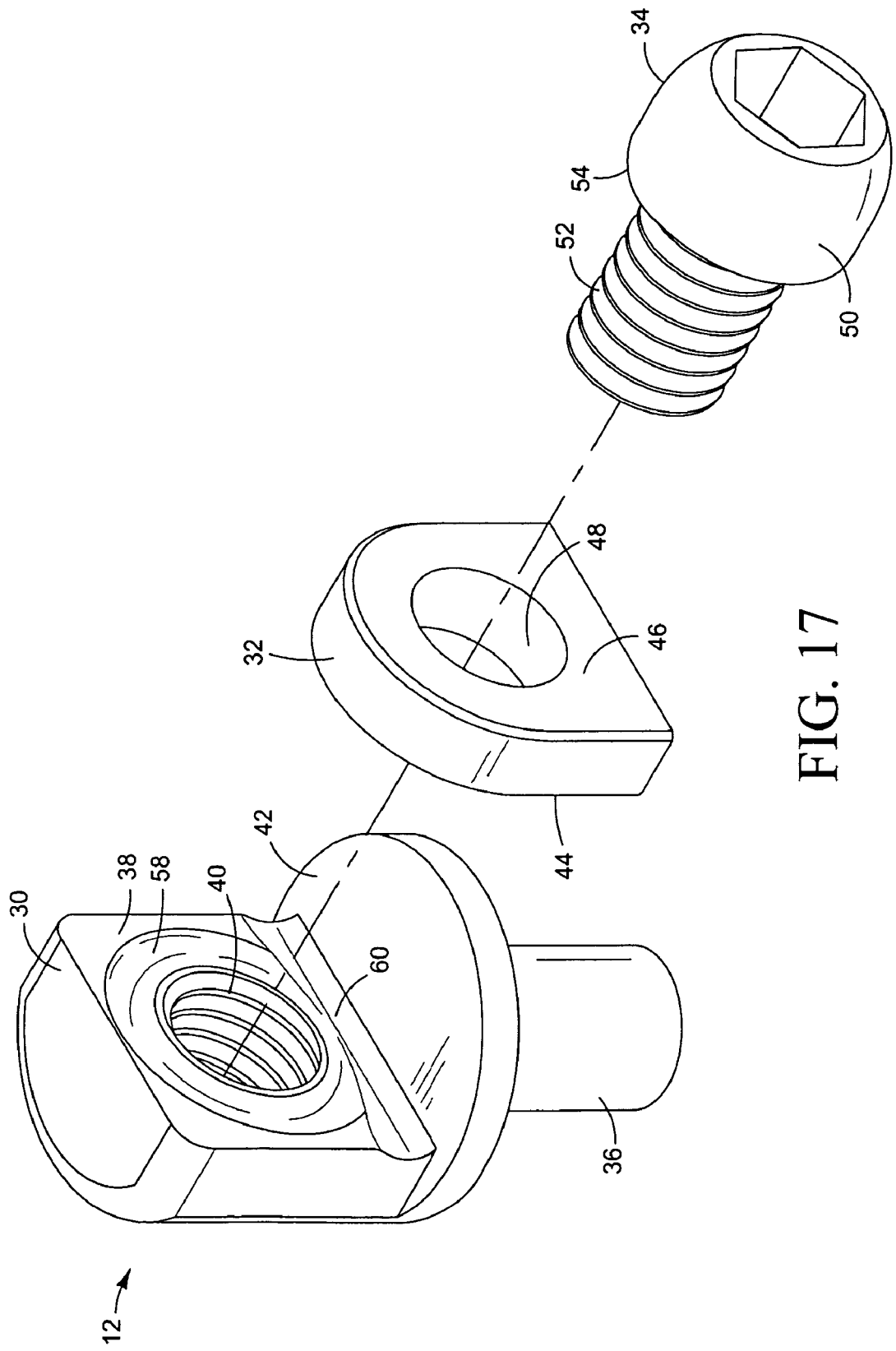

FIG. 17 is an exploded perspective view of a cord clamp according to another embodiment of the invention in which the cord retention grooves are formed on the stationary jaw.

Figure 18:
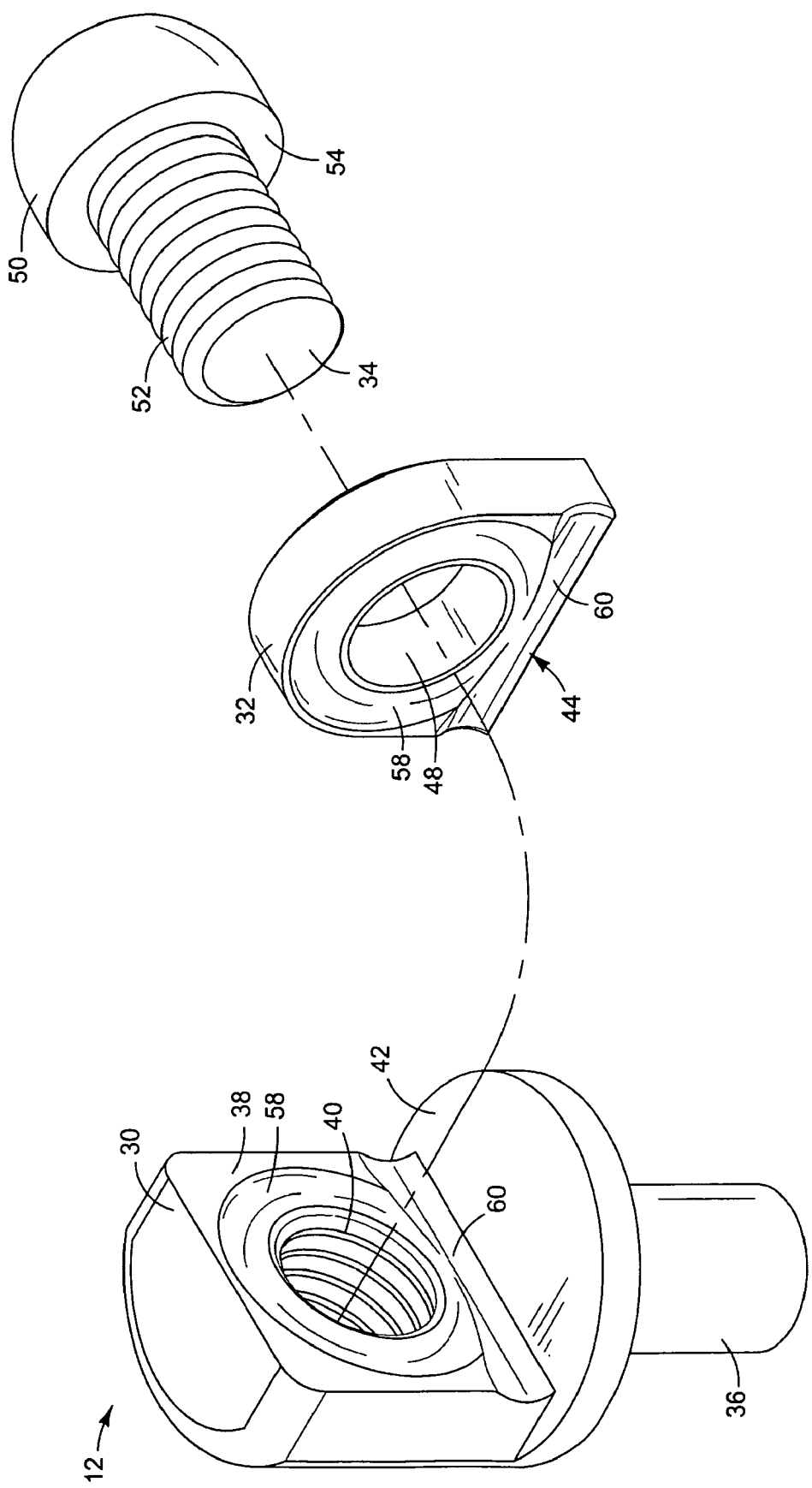

FIG. 18 is an exploded perspective view of a cord clamp according to another embodiment of the invention in which cord retention grooves are formed on the stationary jaw and the movable jaw.

Figure 19:
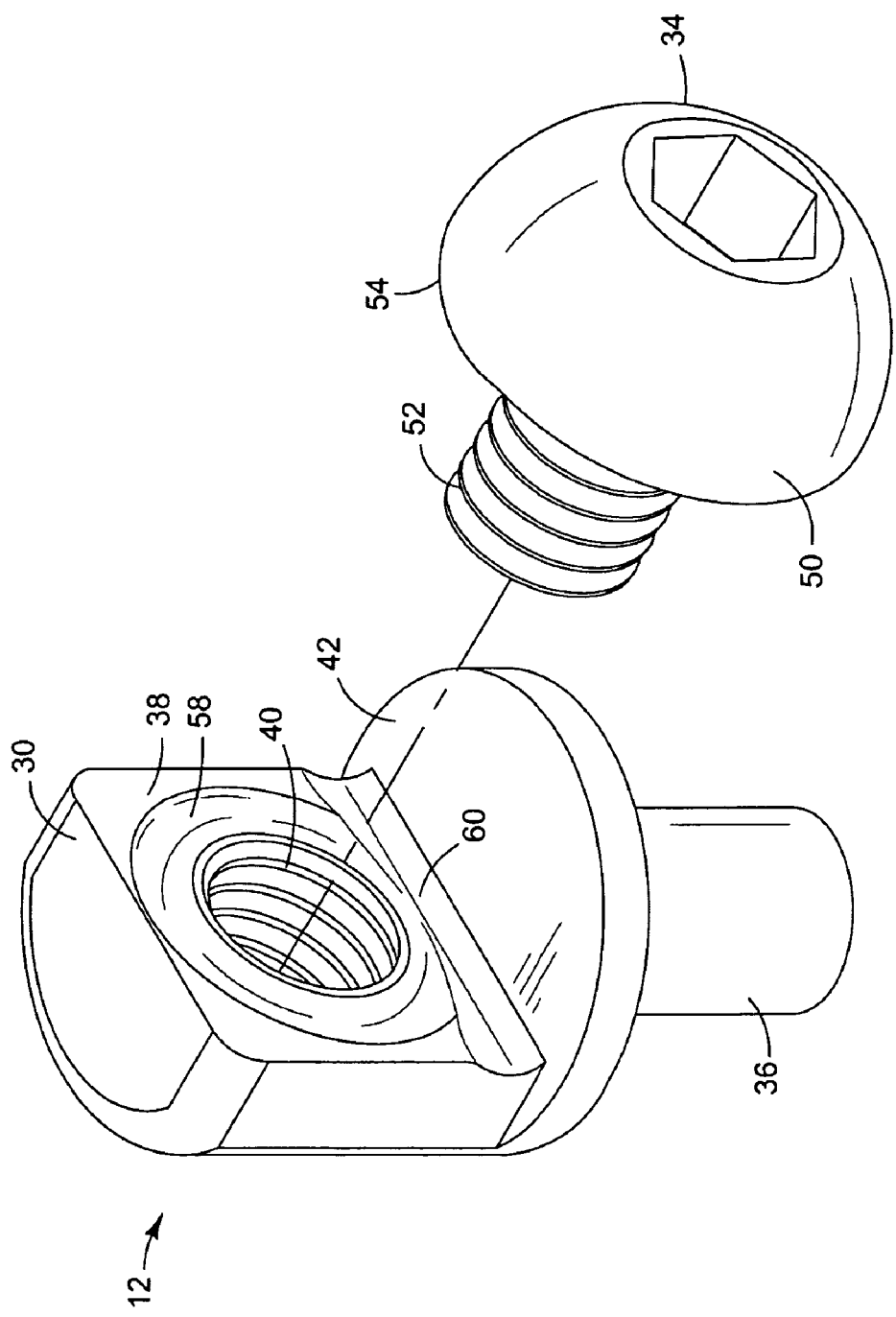

FIG. 19 is an exploded perspective view of a cord clamp according to another embodiment of the invention in which the cord is pinched directly between retention grooves on the stationary jaw and the head of the clamp bolt.

DESCRIPTION

Embodiments of the present invention were developed in an effort to more securely clamp fiber control cords used for bicycle shifting and braking. Embodiments will be described, therefore, with reference to a clamp for securing a fiber control cord to a bicycle brake caliper. Embodiments are not limited to clamping bicycle control cords or fiber cords, but may be implemented in any device and with any cord in which it may be desirable to use the new clamp. Accordingly, the example embodiments shown in the Figures and described below illustrate but do not limit the scope of the invention.

As used in this document: "cord" means an elongated flexible object, specifically including but not limited to fiber control cords and metal control cables used on bicycles; "jaw" means either of two or more opposable parts that open and close for holding or compressing something between them; and an "overhand loop" means a loop created by forming but not tightening an overhand knot or an underhand knot. The knot part of an overhand loop refers to that portion of the loop at which the cord crosses over itself. To the extent a "screw" and a "bolt" might be deemed to be different types of threaded fasteners, those terms are used synonymously in this document to refer to a threaded fastener of either type. For convenience, all references are to a bolt. "Stationary" as that term is used herein with reference to a clamp jaw means that the stationary jaw is stationary relative to the other jaw and to the clamp bolt when the clamp is mounted to another part.

Figure 1:
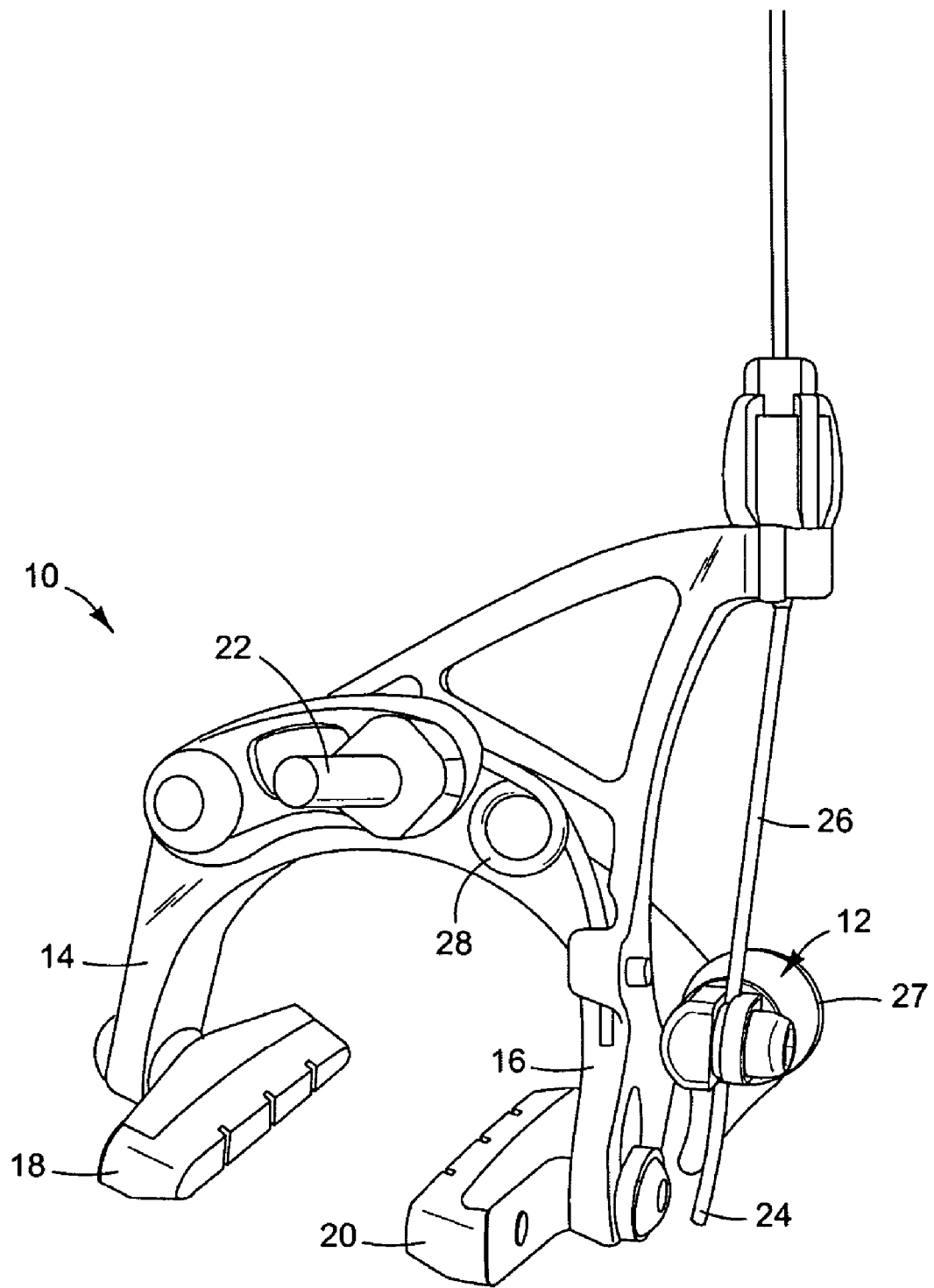
FIG. 1 is a perspective view of a bicycle brake assembly using a cord clamp according to one embodiment of the invention.

FIG. 1 is a perspective view of a bicycle brake assembly 10 using a cord clamp 12 constructed according to one embodiment of the invention. Referring to FIG. 1, brake assembly 10 includes a pair of calipers 14 and 16 and a corresponding pair of brake shoes 18 and 20 each mounted to one of the calipers 14, 16. Brake assembly 10 is mounted to the bicycle frame (not shown) at a center pin 22. One end 24 of a brake control cord 26 is attached to an actuator arm 27 by cord clamp 12. The other end (not shown) of cord 26 is affixed to a brake lever (not shown). Calipers 14 and 16 pivot in to squeeze shoes 18 and 20 against the rim of the bicycle wheel (not shown) when cord 26 is pulled up at the urging of the brake lever. Calipers 14 and 16 pivot back out to disengage shoes 18 and 20 from the wheel rim when the brake lever is released and cord 26 is pulled down at the urging of a return spring 28. Return spring 28 biases calipers 14, 16 and shoes 18, 20 toward the open, disengaged position.

FIG. 2 is a close-up elevation view of clamp 12. FIGS. 3 and 4 are section views taken along the lines 3-3 and 4-4, respectively, in FIG. 2. FIG. 5 is a close-up perspective view of clamp 12 and FIGS. 6-7 are exploded views of clamp 12. Referring to FIGS. 2-7, clamp 12 includes a stationary jaw 30, a movable jaw 32 and a screw or bolt 34. "Stationary" as that term is used herein with reference to jaw 30 means that jaw 30 is stationary relative to jaw 32 and bolt 34 when clamp 12 is affixed to brake caliper 14 (FIG. 1). Stationary jaw 30 is integral to a mounting base 36 secured to caliper 14 (FIG. 1) when clamp 12 is installed on caliper 14. Jaw 30 includes a flat face 38 surrounding an internally threaded hole 40 and a shelf 42 extending out from face 38 below hole 40. Movable jaw 32 includes a grooved face 44 on one side and a flat face 46 on the other side, each surrounding a hole 48 that extends all the way through jaw 32. Bolt 34 includes a head 50, an externally threaded shaft 52, and a flat face 54 on head 50 surrounding shaft 52. As best seen in FIG. 4, when clamp 12 is assembled, bolt face 54 bears against flat face 46 on jaw 32 and grooved face 44 on jaw 32 and face 38 on jaw 30 face one another. Clamp 12 is closed by threading bolt 34 into stationary jaw 30 to move movable jaw 32 in toward jaw 30. Clamp 12 is opened by threading bolt 34 out of stationary jaw 30, allowing movable jaw 32 to move away from jaw 30.

Referring to FIGS. 2-6, an overhand loop 56 in cord 26 is clamped between grooved face 44 on jaw 32 and flat face 38 of jaw 30. Referring now also to the detail views of jaw 32 in FIGS. 8-12, overland loop 56 is configured to fit into an annular groove 58 and a linear groove 60 in jaw face 44. Referring specifically to FIGS. 8-12, linear groove 60 is tangent to annular groove 58, intersecting annular groove 58 along a tangent to groove 58. Annular groove 58 surrounds hole 48 in jaw 32 and linear groove 60 extends across the full width of jaw face 44 along a bottom part 62 of face 44. In the embodiment shown in FIGS. 8-12, linear groove 60 is tangent to annular groove 58 along the centerline of each groove. That is to say, the straight centerline 64 of linear groove 60 is tangent to the circular centerline 66 of annular groove 58 at the point of intersection between the two centerlines 64, 66.

In the embodiment shown in FIGS. 8-12, the cross section profile of each groove 58, 60 transitions from a single smooth curve where grooves 58 and 60 fully overlap one another at the point of intersection, as shown in FIG. 11, to a dual groove profile characterized by a rising apex 70 between two groove parts 72 and 74 where grooves 58 and 60 partially overlap one another moving away from the point of intersection, as shown in FIG. 12, until grooves 58, 60 diverge completely away from one another at locations further away from the point of intersection. Apex 70 may be may be curved, a radius for example, as best seen in FIG. 12, to smooth the intersection between groove parts 72 and 74. Also in the embodiment shown, jaw face 44 includes a flat part 68 partially surrounding annular groove 58 and a flat part 69 around hole 48 at the inner perimeter of groove 58.

In an alternative embodiment shown in FIGS. 13-16, grooves 58 and 60 merge together into a single groove 76 that transitions from a narrower part 78 where grooves 58 and 60 fully overlap one another, as shown in FIG. 15, to a wider part 80 where grooves 58 and 60 partially overlap one another moving away from the narrower part, as shown in FIG. 16.

Clamping cord 26 with overhand loop 56, as best seen in FIGS. 2-4, causes cord 26 to grab more tightly to the clamp as cord 26 is pulled tighter. The holding strength increases as the tension in cord 26 increases. An overhand loop 56 in cord 26 further improves holding strength by increasing the overlapping area at a knot 82 part of loop 56 (FIGS. 3 and 6) along which cord 26 binds against itself, reducing the risk that cord 26 will slip in clamp 12. The configuration of grooved clamping surface 44 may be used to help control the extent to which cord 26 is flattened in clamp 12 and, correspondingly, to help insure a good hold on the sheathed fibers in a fiber control cord. Also, the inside perimeter of an annular groove 58 effectively provides a shaft-like contact surface against which cord 26 at loop 56 can tighten without also tightening against the potentially damaging threads on bolt shaft 52.

For fiber control cords, such as Power Cordz™ from lo DuPont LLC, the cross sectional area of each groove 58 and 60 should be less than about 75% of the cross sectional area of cord 26. It has been observed that the strength of a clamped cord 26 seems to be the greatest where the cross sectional area of each groove 58 and 60 is 60%-75% less than the cross sectional area of cord 26. In the embodiments shown in FIGS. 2-16, circular grooves 58 and 60 have the same depth D (FIGS. 11 and 15), about 0.3 times the diameter of cord 26, and the same width W (FIGS. 11 and 15), about 1.2 times the diameter of cord 26. And, as noted above, linear groove 60 is tangent to annular groove 58 along the centerline of each groove. In this configuration, much of cord 26 is visible in clamp 12 and therefore may be inspected along those points where damage or failure is most likely to occur—for example, cord 26 will start to elongate before the fibers break at a relative weak spot visible near where clamp 26 first contacts cord 26 as cord 26 enters/exits clamp 12, as best seen in the perspective view of FIG. 5. The greater bulk of knot 82 helps protect cord 26 against damage by clamp 26 at this relatively weaker spot. Also, overhand loop 56 typically will be oriented in clamp 12 such that the standing part of cord 26 (i.e., the part in tension when cord 26 is loaded) shown in FIG. 5 lies in linear groove 60 to help further protect the weak spot from damage by clamp 26.

The relative size of annular groove 58 and linear groove 60 and the geometry of the intersection between grooves 58 and 60 may be varied as necessary or desirable for a particular application of clamp 12. For example, it may be desirable for clamping a stiffer, larger diameter cord 26 that develops a more bulky knot in loop 56 to use a linear groove 60 that is deeper and/or wider than annular groove 58 and/or to move the point of intersection out, away from the centerline of one or both grooves 58 and 60.

In an alternative embodiment shown in FIG. 17, cord retention grooves 58 and 60 are formed on the face 38 of stationary clamp jaw 30. In another alternative embodiment shown in FIG. 18, cord retention grooves 58 and 60 are formed on both clamp jaw faces 44 and 38. In another alternative embodiment shown in FIG. 19, bolt 34 also functions as the movable jaw with cord retention grooves 58 and 60 formed on jaw face 38. In each embodiment, the cord retention grooves are formed on the face of a non-rotating part to reduce the risk of damaging the cord while closing (tightening) and opening (releasing) the clamp jaws.

As noted at the beginning of this Description, the example embodiments shown in the figures and described above illustrate but do not limit the invention. Other forms, details, and embodiments may be made and implemented. Therefore, the foregoing description should not be construed to limit the scope of the invention, which is defined in the following claims.

What is claimed is:

1. A clamp jaw, comprising a face having an annular groove therein and a linear groove therein tangent to the annular groove, wherein the linear groove extends all the way across the face.

2. The jaw of claim 1, wherein a centerline of the linear groove is tangent to a centerline of the annular groove.

3. The jaw of claim 1, wherein the annular groove surrounds a hole in the face.

4. The jaw of claim 1, wherein the face includes: a grooved part including the annular groove and the linear groove; and a flat part at least partially surrounding the grooved part.

5. The jaw of claim 4, wherein the annular groove surrounds a hole in the face, and the flat part includes a first flat part surrounding the hole inside the annular groove and a second flat part partially surrounding an outside perimeter of the annular groove.

6. A clamp jaw, comprising a plate having a grooved face on one side of the plate and a flat face on the other side of the plate, the grooved face having a curvilinear groove therein and a linear groove therein intersecting the curvilinear groove, wherein the linear groove extends all the way across the grooved face.

7. The jaw of claim 6, wherein the curvilinear groove comprises a circular groove.

8. The jaw of claim 7, wherein the circular groove comprises an annular groove surrounding a hole through the plate.

9. The jaw of claim 8, wherein the linear groove intersects the annular groove at a tangent to the curvilinear groove.

10. The jaw of claim 9, wherein the linear groove extends all the way across the grooved face from one edge of the plate to another edge of the plate.

11. A clamp, comprising: a first jaw having a flat face; and a second jaw having a grooved face, said second jaw adjustably connected to the first jaw such that the jaws may be closed and opened to clamp and release something between the faces, the second jaw having a said grooved face facing the flat face, and the grooved face having an annular groove therein and a linear groove therein tangent to the annular groove.

12. The clamp of claim 11, further comprising a threaded shaft operatively connected between the jaws for opening and closing the jaws.

13. The clamp of claim 12, wherein: the flat face comprises a threaded opening therein; the annular groove in the grooved face surrounds a hole through the second jaw; and the threaded shaft comprises a bolt, said bolt having a threaded shaft extending through the hole in the second jaw and threaded into the threaded opening in the flat face, and a bolt head bearing against the second jaw.

14. The clamp of claim 11, wherein the first jaw comprises a stationary jaw and the second jaw comprises a movable jaw.

15. An assembly, comprising: a first jaw having a first face; a second jaw having a second face; and an overhand loop of cord compressed between the first face and the second face, wherein the second face comprises a grooved face having an annular groove therein and a linear groove therein tangent to the annular groove, wherein the linear groove extends all the way across the face.

16. The assembly of claim 15, wherein the second face comprises a grooved face having an annular groove therein and a linear groove therein tangent to the annular groove, the overhand loop having a knot part pressed into the grooves at the intersection of the annular groove and the linear groove and a loop part pressed into the annular groove.

17. The assembly of claim 16, wherein the overhand loop is oriented between the jaws such that a standing part of the cord lies in the linear groove.

18. The assembly of claim 16, further comprising a shaft extending between the first face and the second face, and wherein the annular groove and the cord loop surround the shaft.

19. An assembly, comprising an overhand loop in a cord compressed between a first face and a second face, wherein the second face comprises a grooved face having an annular groove therein and a linear groove therein tangent to the annular groove, wherein the linear groove extends all the way across the face.

20. A clamp jaw, comprising a face having an annular groove therein and a linear groove therein tangent to the annular groove; wherein the annular groove surrounds a hole defined through the face; wherein the face includes a grooved part including the annular groove and the linear groove, and a flat part at least partially surrounding the grooved part; and wherein the flat part includes a first flat part surrounding the hole inside the annular groove and a second flat part partially surrounding an outside perimeter of the annular groove.

21. A clamp, comprising a first jaw, a second jaw and a threaded shaft, wherein: said first jaw comprising a flat face having a threaded opening therein; said second jaw comprising a grooved face facing the flat face, the second jaw adjustably connected to the first jaw such that the first and second jaws may be closed and opened to clamp and release something between the flat face and the grooved face, the grooved face having an annular groove therein and a linear groove therein tangent to the annular groove, the annular groove in the grooved face surrounds a hole defined in the second jaw; and said threaded shaft operatively connected between the first and second jaws for opening and closing the first and second jaws, the threaded shaft comprising a bolt having a threaded shaft and a bolt head, the threaded shaft extending through the hole in the second jaw and threaded into the threaded opening in the flat face, the bolt head bearing against the second jaw.

\* \* \* \* \*